US012522394B2

United States Patent
Fenu et al.

(10) Patent No.: US 12,522,394 B2
(45) Date of Patent: Jan. 13, 2026

(54) METHOD FOR ASSESSING QUALITY OF A TRANSVERSAL SEALING OF A FOOD PACKAGE

(71) Applicant: Tetra Laval Holdings & Finance S.A., Pully (CH)

(72) Inventors: Fabrizio Fenu, Modena (IT); Luca Maltoni, Modena (IT); Alessandro Brehas, Modena (IT); Edoardo Motti, Modena (IT)

(73) Assignee: Tetra Laval Holdings & Finance S.A., Pully (CH)

( * ) Notice: Subject to any disclaimer, the term of this patent is extended or adjusted under 35 U.S.C. 154(b) by 37 days.

(21) Appl. No.: 18/546,082

(22) PCT Filed: Feb. 14, 2022

(86) PCT No.: PCT/EP2022/053497
§ 371 (c)(1),
(2) Date: Aug. 10, 2023

(87) PCT Pub. No.: WO2022/171856
PCT Pub. Date: Aug. 18, 2022

(65) Prior Publication Data
US 2024/0317444 A1    Sep. 26, 2024

(30) Foreign Application Priority Data
Feb. 15, 2021   (EP) ..................... 21157016

(51) Int. Cl.
*B65B 57/16*   (2006.01)
*B65B 51/14*   (2006.01)
*G01B 11/27*   (2006.01)

(52) U.S. Cl.
CPC ............ *B65B 57/16* (2013.01); *B65B 51/144* (2013.01); *G01B 11/27* (2013.01)

(58) Field of Classification Search
CPC ................................ B65B 57/16; G01B 11/27
See application file for complete search history.

(56) References Cited

U.S. PATENT DOCUMENTS

| 2,899,875 A | 8/1959 | Leasure |
| 3,369,727 A | 2/1968 | Wright |

(Continued)

FOREIGN PATENT DOCUMENTS

| CH | 676958 A5 | 3/1991 |
| CN | 1272444 | 11/2000 |

(Continued)

OTHER PUBLICATIONS

Davis, J.R, "Practical Design Guidelines for Surface Engineering" Chapter 8, Surface Engineering for Corrosion and I/Vear Resistance, ASM International, Mar. 2001; eISBN: 9781615030729, pISBN: 9780871707000; pp. 195-229.

(Continued)

*Primary Examiner* — Lucas E. A. Palmer
(74) *Attorney, Agent, or Firm* — Knobbe, Martens, Olson & Bear, LLP

(57) ABSTRACT

A method (400) for assessing quality of a transversal sealing (102) of a paperboard-based food package (100), wherein the food package (100) comprises a longitudinal scaling (104), and is provided with an reference imprint (106) in connection to the transversal sealing (102) is provided. The method (400) comprising, capturing (S402), by a camera (202), image data of the transversal scaling (102), determining (S404), in the image data, a position of the reference imprint (106), determining (S406), in the image data, a position of a reference line (104), determining (S408) quality measurement data of the transversal sealing (102) based on the position of the reference imprint (106) relative to the position of the reference line (104).

14 Claims, 5 Drawing Sheets

(56) References Cited

U.S. PATENT DOCUMENTS

| | | | |
|---|---|---|---|
| 3,408,242 A | 10/1968 | Rochla | |
| 3,466,841 A | 9/1969 | Rausing | |
| 3,580,788 A | 5/1971 | Gustafson | |
| 3,633,814 A | 1/1972 | Michetti et al. | |
| 3,684,619 A | 8/1972 | Engler et al. | |
| 3,721,534 A | 3/1973 | Kubick | |
| 3,731,872 A | 5/1973 | McCormick | |
| 3,808,074 A | 4/1974 | Smith et al. | |
| 3,854,874 A | 12/1974 | Loliger et al. | |
| 3,864,186 A | 2/1975 | Balla | |
| 3,884,746 A | 5/1975 | Loliger et al. | |
| 3,890,125 A | 6/1975 | Schoeck | |
| 4,169,004 A | 9/1979 | Kock et al. | |
| 4,506,125 A | 3/1985 | Smets | |
| 4,574,566 A * | 3/1986 | Eaves | B65B 9/067 |
| | | | 53/550 |
| 4,704,509 A | 11/1987 | Hilmersson | |
| 4,721,242 A | 1/1988 | Reil | |
| 4,730,766 A | 3/1988 | Fear | |
| 4,757,175 A | 7/1988 | Mohr et al. | |
| 4,776,980 A | 10/1988 | Ruffini | |
| 4,784,697 A | 11/1988 | Bordini | |
| 4,808,326 A | 2/1989 | Tanino et al. | |
| 4,809,485 A | 3/1989 | Nielsen | |
| 5,044,140 A | 9/1991 | Iwano | |
| 5,101,999 A | 4/1992 | Robichaud et al. | |
| 5,200,587 A | 4/1993 | Fang | |
| 5,220,771 A | 6/1993 | Burns | |
| 5,250,140 A | 10/1993 | Hayashi et al. | |
| 5,260,535 A | 11/1993 | Holmström et al. | |
| 5,260,766 A * | 11/1993 | Armitage | B29C 66/4312 |
| | | | 250/559.46 |
| 5,286,941 A | 2/1994 | Bel | |
| 5,358,175 A | 10/1994 | Cai | |
| 5,418,069 A | 5/1995 | Learman | |
| 5,418,811 A | 5/1995 | Ruffini et al. | |
| 5,505,326 A | 4/1996 | Junko | |
| 5,515,159 A * | 5/1996 | Sites | G01N 21/9515 |
| | | | 348/92 |
| 5,518,578 A | 5/1996 | Persells | |
| 5,588,019 A | 12/1996 | Ruffini et al. | |
| 5,649,407 A | 7/1997 | Blomqvist | |
| 5,714,033 A | 2/1998 | Hayashi et al. | |
| 5,889,263 A | 3/1999 | Andersson | |
| 5,968,399 A | 10/1999 | Selberg | |
| 6,012,267 A | 1/2000 | Katsumata | |
| 6,045,004 A | 4/2000 | Elliott | |
| 6,088,994 A * | 7/2000 | Nakagawa | B29C 66/4312 |
| | | | 53/374.6 |
| 6,167,681 B1 | 1/2001 | Yano et al. | |
| 6,182,887 B1 * | 2/2001 | Ljunstrom | B65D 73/0028 |
| | | | 229/137 |
| 6,216,420 B1 | 4/2001 | Mazetto | |
| 6,396,578 B2 * | 5/2002 | Her | G01N 21/95684 |
| | | | 382/145 |
| 6,430,899 B1 | 8/2002 | Cicha | |
| 6,503,963 B2 | 1/2003 | Toyoda et al. | |
| 6,588,174 B2 | 7/2003 | Yamamoto | |
| 6,659,308 B1 | 12/2003 | Kelder et al. | |
| 6,725,634 B1 | 4/2004 | Palmqvist et al. | |
| 6,751,925 B1 | 6/2004 | Kinoshita et al. | |
| 6,837,025 B2 | 1/2005 | Kume et al. | |
| 7,002,117 B2 | 2/2006 | Thomasset | |
| 7,003,934 B1 | 2/2006 | Yano | |
| 7,036,683 B2 | 5/2006 | Dubach | |
| 7,337,928 B2 | 3/2008 | Jackman | |
| 7,484,641 B2 | 2/2009 | Casale et al. | |
| 7,703,642 B2 | 4/2010 | Scott | |
| 7,827,768 B2 | 11/2010 | Rosberg et al. | |
| 8,223,200 B1 * | 7/2012 | Benttine | G01N 21/8806 |
| | | | 382/143 |
| 8,372,328 B2 | 2/2013 | Dubach | |
| 8,443,970 B2 | 5/2013 | Coon | |
| 8,572,936 B2 | 11/2013 | Mancin et al. | |
| 8,707,661 B2 | 4/2014 | Kiinoshita et al. | |
| 8,707,662 B2 | 4/2014 | Borsari et al. | |
| 8,839,597 B2 * | 9/2014 | Babini | B29C 66/232 |
| | | | 53/374.6 |
| 8,938,938 B2 | 1/2015 | Konno et al. | |
| 8,943,786 B2 | 2/2015 | Konno et al. | |
| 9,238,515 B2 | 1/2016 | Persson et al. | |
| 9,352,869 B2 | 5/2016 | Babini et al. | |
| 9,545,751 B2 | 1/2017 | Hull | |
| 9,637,260 B2 | 5/2017 | Ghirardello et al. | |
| 9,650,174 B2 | 5/2017 | Seelhofer et al. | |
| 9,988,192 B2 | 6/2018 | Canegallo | |
| 10,160,162 B2 | 12/2018 | Bierlein et al. | |
| 10,322,546 B2 | 6/2019 | Bierlein et al. | |
| 10,350,829 B2 | 7/2019 | Sandberg et al. | |
| 10,350,832 B2 | 7/2019 | Karlsson et al. | |
| 10,358,243 B2 | 7/2019 | Israelsson et al. | |
| 10,414,098 B2 | 9/2019 | Aurand et al. | |
| 10,486,839 B2 * | 11/2019 | Kogure | B65B 9/20 |
| 10,542,946 B2 | 1/2020 | Martin | |
| 10,640,242 B2 | 5/2020 | Stajkovic et al. | |
| 10,773,846 B2 * | 9/2020 | Gentili | B29C 66/81435 |
| 10,875,675 B2 | 12/2020 | Benedetti et al. | |
| 10,899,082 B2 | 1/2021 | Israelsson et al. | |
| 10,919,238 B2 | 2/2021 | Lancelotti et al. | |
| 10,994,495 B2 | 5/2021 | Israelsson et al. | |
| 11,097,861 B1 | 8/2021 | Donati | |
| 11,230,408 B2 | 1/2022 | Benko et al. | |
| 11,370,571 B2 | 6/2022 | Svard et al. | |
| 11,534,985 B2 | 12/2022 | Palmquist | |
| 11,554,555 B2 | 1/2023 | Keikhaee et al. | |
| 11,572,207 B2 | 2/2023 | Ferrarini et al. | |
| 11,866,213 B2 * | 1/2024 | Hallstadius | B29C 66/72328 |
| 2001/0015056 A1 * | 8/2001 | Hiramoto | B29C 65/7885 |
| | | | 53/507 |
| 2001/0017021 A1 | 8/2001 | Sanfilippo et al. | |
| 2001/0047641 A1 | 12/2001 | Kume et al. | |
| 2002/0047009 A1 | 4/2002 | Flugstad et al. | |
| 2002/0108705 A1 | 8/2002 | Kume et al. | |
| 2003/0044056 A1 * | 3/2003 | Katt | G01N 21/89 |
| | | | 382/143 |
| 2003/0116886 A1 | 6/2003 | Nakazawa | |
| 2003/0230941 A1 | 12/2003 | Jacobs | |
| 2004/0045635 A1 | 3/2004 | Bandyopadhyay et al. | |
| 2004/0060928 A1 | 4/2004 | Balla | |
| 2004/0182046 A1 | 9/2004 | Babini et al. | |
| 2005/0076612 A1 | 4/2005 | Andersson et al. | |
| 2005/0172574 A1 | 8/2005 | Paradisi et al. | |
| 2005/0241277 A1 | 11/2005 | Yano et al. | |
| 2006/0026929 A1 | 2/2006 | Kinoshita et al. | |
| 2006/0109013 A1 | 5/2006 | Kinoshita et al. | |
| 2006/0124626 A1 | 6/2006 | Kupfer et al. | |
| 2006/0154052 A1 | 7/2006 | Waffenschmidt et al. | |
| 2007/0040009 A1 | 2/2007 | Sase et al. | |
| 2007/0251196 A1 | 11/2007 | Shokri et al. | |
| 2009/0101286 A1 | 4/2009 | Sumeer et al. | |
| 2009/0223173 A1 | 9/2009 | Rapparini | |
| 2010/0025391 A1 | 2/2010 | Palombini et al. | |
| 2010/0155390 A1 | 6/2010 | Hirota | |
| 2010/0180545 A1 | 7/2010 | Palmquist et al. | |
| 2010/0186349 A1 | 7/2010 | Zanini et al. | |
| 2010/0243155 A1 | 9/2010 | Andrews | |
| 2011/0030315 A1 | 2/2011 | Mancin | |
| 2011/0094672 A1 | 4/2011 | Wijk et al. | |
| 2011/0099955 A1 | 5/2011 | Konno et al. | |
| 2011/0120059 A1 | 5/2011 | Andreotti et al. | |
| 2011/0185686 A1 | 8/2011 | Konno et al. | |
| 2011/0192113 A1 | 8/2011 | Kiinoshita et al. | |
| 2011/0225929 A1 | 9/2011 | Donati et al. | |
| 2012/0138634 A1 * | 6/2012 | Benko | B65D 85/80 |
| | | | 229/200 |
| 2012/0266571 A1 | 10/2012 | Persson et al. | |
| 2013/0063556 A1 | 3/2013 | Russell et al. | |
| 2013/0119044 A1 | 5/2013 | Gynnild | |
| 2013/0228614 A1 * | 9/2013 | Bergholtz | B65D 5/06 |
| | | | 428/211.1 |
| 2013/0263556 A1 | 10/2013 | Babini et al. | |
| 2014/0196407 A1 * | 7/2014 | Ghirardello | B65B 9/20 |
| | | | 53/167 |

(56) References Cited

U.S. PATENT DOCUMENTS

| | | | |
|---|---|---|---|
| 2015/0021381 A1* | 1/2015 | Dolby | B65D 5/46096 |
| | | | 229/5.83 |
| 2015/0210414 A1* | 7/2015 | Avril | B65B 35/58 |
| | | | 198/411 |
| 2015/0266603 A1 | 9/2015 | Aul et al. | |
| 2016/0067937 A1 | 3/2016 | Yeager et al. | |
| 2016/0122051 A1 | 5/2016 | Andersson | |
| 2016/0221250 A1 | 8/2016 | Alexandersson et al. | |
| 2016/0229118 A1 | 8/2016 | Palmquist et al. | |
| 2016/0297121 A1 | 10/2016 | Palmquist et al. | |
| 2017/0021959 A1 | 1/2017 | Benko et al. | |
| 2017/0036797 A1 | 2/2017 | Israelsson et al. | |
| 2017/0073102 A1* | 3/2017 | Borasi | B65B 3/025 |
| 2017/0182702 A1 | 6/2017 | Mach et al. | |
| 2017/0240309 A1 | 8/2017 | Runini et al. | |
| 2017/0274582 A1 | 9/2017 | Karlsson et al. | |
| 2018/0243996 A1 | 8/2018 | Bates et al. | |
| 2018/0250888 A1 | 9/2018 | Mach | |
| 2018/0272620 A1 | 9/2018 | Persson | |
| 2018/0345592 A1 | 12/2018 | Israelsson et al. | |
| 2018/0354199 A1 | 12/2018 | Sandberg et al. | |
| 2019/0152161 A1 | 5/2019 | Palmquist et al. | |
| 2020/0017246 A1 | 1/2020 | Stajkovic et al. | |
| 2020/0031518 A1 | 1/2020 | Benko et al. | |
| 2020/0101678 A1 | 4/2020 | Keikhaee et al. | |
| 2020/0148406 A1 | 5/2020 | Svard et al. | |
| 2020/0172278 A1 | 6/2020 | Gentili et al. | |
| 2020/0290787 A1* | 9/2020 | Rapparini | B65D 33/02 |
| 2020/0406562 A1 | 12/2020 | Lancelotti et al. | |
| 2021/0237925 A1 | 8/2021 | Barbieri et al. | |
| 2021/0237926 A1 | 8/2021 | Barbieri et al. | |
| 2021/0245902 A1 | 8/2021 | Donati | |
| 2021/0321920 A1* | 10/2021 | Ahl | B65B 61/025 |
| 2021/0331426 A1 | 10/2021 | Sanibondi et al. | |
| 2021/0331823 A1* | 10/2021 | Hallstadius | B29C 66/72328 |
| 2021/0394938 A1 | 12/2021 | Ferrarini et al. | |
| 2022/0048657 A1 | 2/2022 | Sanibondi et al. | |
| 2022/0127031 A1 | 4/2022 | Karlsson et al. | |
| 2022/0227519 A1 | 7/2022 | Brehas et al. | |
| 2022/0249721 A1* | 8/2022 | Saeidihaghi | A61L 2/20 |
| 2022/0306327 A1* | 9/2022 | Fortini | B65B 57/10 |

FOREIGN PATENT DOCUMENTS

| | | | | |
|---|---|---|---|---|
| CN | 1360552 | 7/2002 | | |
| CN | 1608017 | 4/2005 | | |
| CN | 1630599 | 6/2005 | | |
| CN | 1688483 | 10/2005 | | |
| CN | 1705875 | 12/2005 | | |
| CN | 200988594 | 12/2007 | | |
| CN | 102089212 | 6/2011 | | |
| CN | 102131707 | 7/2011 | | |
| CN | 102181156 | 9/2011 | | |
| CN | 102666292 | 9/2012 | | |
| CN | 102686483 | 9/2012 | | |
| CN | 103228544 | 7/2013 | | |
| CN | 103501982 | 1/2014 | | |
| CN | 105073368 | 11/2015 | | |
| CN | 205470247 | 8/2016 | | |
| CN | 106275688 | 1/2017 | | |
| CN | 107264911 | 10/2017 | | |
| CN | 107264912 | 10/2017 | | |
| CN | 107264914 | 10/2017 | | |
| CN | 107406160 | 11/2017 | | |
| CN | 108100360 | 6/2018 | | |
| CN | 208233750 | 12/2018 | | |
| CN | 210761729 | 6/2020 | | |
| CN | 210793949 | 6/2020 | | |
| CN | 112638777 | 4/2021 | | |
| DE | 19815439 | 10/1999 | | |
| DE | 10023000 | 1/2002 | | |
| DE | 10111841 | 9/2002 | | |
| DE | 102015102860 | 9/2016 | | |
| DE | 102016003826 | 10/2017 | | |
| EP | 0144736 | 6/1985 | | |
| EP | 0147833 | 7/1985 | | |
| EP | 0212490 | 3/1987 | | |
| EP | 0223517 | 5/1987 | | |
| EP | 0225392 | 6/1987 | | |
| EP | 0466271 | 1/1992 | | |
| EP | 0484998 | 5/1992 | | |
| EP | 0495699 | 7/1992 | | |
| EP | 0557867 | 1/1994 | | |
| EP | 0653899 | 5/1995 | | |
| EP | 0730946 | 9/1996 | | |
| EP | 0796718 | 9/1997 | | |
| EP | 0819607 | 1/1998 | | |
| EP | 0950608 | 10/1999 | | |
| EP | 0798216 | 11/2000 | | |
| EP | 1066951 | 1/2001 | | |
| EP | 1088764 | 4/2001 | | |
| EP | 1107358 | 6/2001 | | |
| EP | 1125844 | 8/2001 | | |
| EP | 0706945 | 10/2001 | | |
| EP | 1231149 | 8/2002 | | |
| EP | 1234771 | 8/2002 | | |
| EP | 1241098 | 9/2002 | | |
| EP | 1270182 | 1/2003 | | |
| EP | 1300340 | 4/2003 | | |
| EP | 1316508 | 6/2003 | | |
| EP | 1334911 | 8/2003 | | |
| EP | 1334912 | 8/2003 | | |
| EP | 1509453 | 3/2005 | | |
| EP | 1535843 | 6/2005 | | |
| EP | 1541641 | 6/2005 | | |
| EP | 1555524 | 7/2005 | | |
| EP | 3053834 | 8/2005 | | |
| EP | 1413520 | 8/2006 | | |
| EP | 1790572 | 5/2007 | | |
| EP | 1795448 | 6/2007 | | |
| EP | 2008795 | 12/2008 | | |
| EP | 2026630 | 2/2009 | | |
| EP | 2151390 | 2/2010 | | |
| EP | 2186624 | 5/2010 | | |
| EP | 2236270 | 10/2010 | | |
| EP | 2343242 | 7/2011 | | |
| EP | 2392517 | 12/2011 | | |
| EP | 2468480 | 6/2012 | | |
| EP | 2650222 | 10/2013 | | |
| EP | 2695816 | 2/2014 | | |
| EP | 2781325 | 9/2014 | | |
| EP | 3000584 | 3/2016 | | |
| EP | 2448829 | 6/2016 | | |
| EP | 3241667 | 11/2017 | | |
| EP | 3254979 | 12/2017 | | |
| EP | 3261932 | 12/2018 | | |
| EP | 3438007 | 2/2019 | | |
| EP | 3303151 | 7/2019 | | |
| EP | 3647024 | 5/2020 | | |
| EP | 3647024 A1 * | 5/2020 | | B29C 65/08 |
| EP | 3757554 | 12/2020 | | |
| FR | 1433873 | 4/1966 | | |
| FR | 2073137 | 9/1971 | | |
| FR | 2776616 | 10/1999 | | |
| GB | 869759 | 6/1961 | | |
| GB | 1243812 | 8/1971 | | |
| GB | 789981 | 7/2011 | | |
| GB | 2506681 | 4/2014 | | |
| IN | 10126DEN2014 | 8/2014 | | |
| JP | S57148619 | 9/1982 | | |
| JP | S 63-23900 B | 5/1988 | | |
| JP | S63-187591 | 8/1988 | | |
| JP | S63-258729 | 10/1988 | | |
| JP | H01-111633 | 4/1989 | | |
| JP | H04-6025 | 1/1992 | | |
| JP | H 04-72141 A | 3/1992 | | |
| JP | H04-154564 | 5/1992 | | |
| JP | H08-91348 | 4/1996 | | |
| JP | H08-244728 | 9/1996 | | |
| JP | H09-077006 | 3/1997 | | |
| JP | H10-321361 | 12/1998 | | |
| JP | H11-43115 | 2/1999 | | |
| JP | H11-514319 | 12/1999 | | |

(56) References Cited

FOREIGN PATENT DOCUMENTS

| | | | | |
|---|---|---|---|---|
| JP | 2000-127198 | | 5/2000 | |
| JP | 2002-046703 | A | 2/2002 | |
| JP | 2004-228043 | | 8/2004 | |
| JP | 2005-035580 | A | 2/2005 | |
| JP | 2005-035583 | A | 2/2005 | |
| JP | 2008-089437 | A | 4/2008 | |
| JP | 2009-149365 | | 7/2009 | |
| JP | 2009156822 | A * | 7/2009 | ........... G01N 21/909 |
| JP | 2009-012354 | | 11/2009 | |
| JP | 2012-136289 | A | 7/2012 | |
| JP | 2013-531587 | A | 8/2013 | |
| JP | 2015-16894 | | 1/2015 | |
| KR | 20020097097 | A | 12/2002 | |
| RU | 2096280 | C1 | 11/1997 | |
| RU | 90415 | U1 | 1/2010 | |
| SE | 434240 | | 7/1984 | |
| SU | 1551588 | A1 | 3/1990 | |
| SU | 1413026 | A1 | 7/1998 | |
| WO | WO 1992/015182 | | 9/1992 | |
| WO | WO 1997/14547 | | 4/1997 | |
| WO | WO 1999/029574 | | 6/1999 | |
| WO | WO 2001/085827 | | 11/2001 | |
| WO | WO 2002/10020 | | 2/2002 | |
| WO | WO 2003/053626 | | 7/2003 | |
| WO | WO 2003/097332 | | 11/2003 | |
| WO | WO 2005/004560 | | 1/2005 | |
| WO | WO 2005/105579 | | 11/2005 | |
| WO | WO 2005/110855 | | 11/2005 | |
| WO | WO 2007/008131 | | 1/2007 | |
| WO | WO 2009/139129 | | 11/2009 | |
| WO | WO 2010/136756 | | 12/2010 | |
| WO | WO 2011/020634 | | 2/2011 | |
| WO | WO 2011/075055 | | 6/2011 | |
| WO | WO 2012/019925 | | 2/2012 | |
| WO | WO 2012/103592 | | 8/2012 | |
| WO | WO 2012/173562 | | 12/2012 | |
| WO | WO 2013/045254 | | 4/2013 | |
| WO | WO 2014/072477 | | 5/2014 | |
| WO | WO 2014/118813 | | 8/2014 | |
| WO | WO 2014/166765 | | 10/2014 | |
| WO | WO 2014/195112 | | 12/2014 | |
| WO | WO 2015/036222 | | 3/2015 | |
| WO | WO 2015/040173 | | 3/2015 | |
| WO | WO 2015/079416 | | 6/2015 | |
| WO | WO 2015/158502 | | 10/2015 | |
| WO | WO 2016/052689 | | 4/2016 | |
| WO | WO 2016/083212 | | 6/2016 | |
| WO | WO 2016/132986 | | 8/2016 | |
| WO | WO 2017/001162 | | 1/2017 | |
| WO | WO 2017/025922 | | 2/2017 | |
| WO | WO 2017/089186 | | 6/2017 | |
| WO | WO 2017/089187 | | 6/2017 | |
| WO | WO 2017/157676 | | 9/2017 | |

OTHER PUBLICATIONS

International Search Report and Written Opinion received in PCT Application No. PCT/EP2022/053497 as mailed Jun. 15, 2022 in 10 pages.

Leschynsky et al "Layered Alloys for Effective Magnetic Flux Concentration in Induction Heating," Materials Science—Poland, vol. 25, No. 2, 2007.

* cited by examiner

METHOD FOR ASSESSING QUALITY OF A TRANSVERSAL SEALING OF A FOOD PACKAGE

TECHNICAL FIELD

The invention relates to packaging technology. More particularly, it is related to a method for assessing quality of a transversal sealing of a food package.

BACKGROUND ART

Today, within the food industry, an essential part of a food product is the packaging. Apart from branding of the product and presenting the customers with information the package also has an important role of ensuring the food safety. The packaging materials used in the package can be designed to provide strength and stability, so that the packages are not damaged during transportation. Furthermore, the packaging materials can form a protected environment for the food product so that it is protected from for example bacteria, germs, oxygen and sun light. However, the packaging material is not the only thing that is important in the package. The package needs also to be sealed properly. In a roll-fed system this is usually made by forming a longitudinal sealing along an overlap between two ends of the packaging material such that a tube is formed and thereafter forming packages from the tube by making transversal sealings along two ends of the tube.

Ensuring the quality of the transversal sealing of a food package is not an easy task. Today, a common way of doing this is to manually evaluate batches of the food packages after a fixed amount of time. However, to ensure the quality of the food packages in this way takes a substantial amount of time. It is therefore need for an improved method for evaluating the quality of the transversal sealing in food packages.

SUMMARY

It is an object of the invention to at least partly overcome one or more of the above-identified limitations of the prior art. In particular, it is an object to provide improved solutions for assessing quality of a transversal sealing of a food package and an arrangement thereof.

It has been realized that by using a reference imprint, which may be made by an anvil during transversal sealing, analysing image data of the transversal sealing, the transversal sealing can be continuously monitored and actions can be taken at an early stage. This also leads to a more time-efficient process as opposed to today's methods.

According to a first aspect, it is provided a method for assessing quality of a transversal sealing of a paperboard-based food package, wherein the food package comprises a longitudinal sealing, and is provided with an reference imprint in connection to the transversal sealing. The method comprising: capturing, by a camera, image data of the transversal sealing, determining, in the image data, a position of the reference imprint, determining, in the image data, a position of a reference line, determining quality measurement data of the transversal sealing based on the position of the reference imprint relative to the position of the reference line.

The quality measurement data may give information about the quality of the transversal sealing. It may also give information about what makes the transversal sealing good or bad. The quality measurement data may be one or more numerical values that can be used to assess the quality of the transversal sealing. Alternatively, it may be non-numerical values. For instance, it may be a label describing the quality such as "good" or "bad".

The reference imprint may be interpreted as a mark or a sequence of marks in the packaging material.

The reference imprint and the reference line may be interpreted as identifiable features on the food package of which their positions relative each other are predefined in a food package having a correctly sealed transversal sealing. Thus, any deviations from this, may indicate that the food package is deficient.

The food package may comprise one or more reference lines. The quality measurement data may be determined based on the position of the one or more reference lines relative to each other and/or relative to the reference imprint.

By capturing image data of the transversal sealing and the reference imprint, and determining the quality measurement data from the image data allows for every food package to be continuously assessed without interrupting the production line.

The reference line may be an edge of the longitudinal sealing. A critical part of the transversal sealing is where it intersects with the longitudinal sealing due to the amount of overlapping packaging material layers. Using the edge of the longitudinal sealing as the reference line may thus be advantageous in that this critical part area can be in the focus of the quality assessment. Further, the position of the reference imprint relative to the edge of the longitudinal sealing may give indication of if the packaging material was twisted during the transversal sealing process. Even further, the edge of the longitudinal sealing can be easy to determine in the image data because of the difference in packaging material thickness.

The reference imprint may comprise a sequence of valleys and ridges in the packaging material. Alternatively, the reference imprint may comprise a single dot in the packaging material. An advantage of having a sequence of marks, such as a sequence of valleys and ridges, may be that the imprint as a whole is more easily determined in the image data when there are multiple marks. The quality of the marks may differ, so by having multiple marks, the most distinctive mark in the image data can be identified to determine the position of the reference imprint. Further, having the reference imprint as physical marks may be an advantage compared to having it printed in that it can more easily be determined in the image data.

The ridges and valleys may extend parallel to the reference line. An advantage of this may be that a distance between the reference line and the reference imprint can in this way easily be determined.

The reference imprint may comprise at least three valleys. The reference imprint may extend 6 to 10 mm along the transversal sealing.

The reference imprint may extend over the longitudinal sealing. An advantage of having the reference imprint extend over the longitudinal sealing may be that the extra pressure applied in the transversal sealing to create the imprint also adds to an improved sealing of the critical area where the longitudinal sealing intersects the transversal sealing.

The step of capturing the image data may comprise the sub-step of illuminating the transversal sealing by a light source along an illumination axis, wherein the illumination axis forms an angle of 40 to 90 degrees to the optical axis of the camera.

An advantage of illuminating the transversal sealing at an angle is that the three dimensional features of the reference imprint and/or reference line can be enhanced in the image data due to shadows caused by the light.

The transversal sealing may be illuminated by infrared light. An advantage of using infrared light is that the presence of irrelevant features in the image data, such as the décor of the food package, can be reduced.

The transversal sealing may be on a top of the food package or on a bottom of the food package.

Determining the quality measurement data may comprise determining a distance between the reference line and a pre-determined section of the reference imprint. The predetermined section may for instance be the one of the valleys in a case where the reference imprint comprises a sequence of valleys and ridges. The predetermined section may be chosen as the most distinctive valley in a reference imprint comprising a sequence of valleys and peaks.

The method may further comprise transmitting the quality measurement data to a packaging machine and adjusting settings of the packaging machine based on the quality measurement data.

Adjusting the settings of the packaging machine based on the quality assessment is advantageous in that the packaging machine can quickly adjust if it starts to produce deficient packages so that the waste of food packages is reduced.

The packaging machine may discard food packages based on the quality measurement data.

According to a second aspect, an arrangement for assessing quality of a transversal sealing of a food package is provided. The food package comprising a longitudinal sealing, and provided with an reference imprint in connection to the transversal sealing.

The arrangement comprises a camera configured to capture image data of the transversal sealing, an image processing device configured to: determine, in the image data, a position of the reference imprint, determine, in the image data, a position of a reference line, and determine quality measurement data of the transversal sealing based on the position of the reference imprint relative to the position of the reference line.

The arrangement may further comprise, a light source configured to illuminate the transversal sealing along an illumination axis at an angle from an optical axis of the camera.

The light source may emit infrared light. The angle may be 40 to 90 degrees.

According to a third aspect, it is provided a system comprising a packaging machine configured to produce the food package, and the arrangement according to the second aspect.

The arrangement may be further configured to transmit the quality measurement data to the packaging machine. The packaging machine may be further configured to: receive the quality measurement data, and adjust settings based on the quality measurement data.

According to a fourth aspect, a non-transitory computer-readable storage medium having stored thereon program code portions for implementing the method according to the first aspect when executed on a device having processing capabilities is provided.

Still other objectives, features, aspects and advantages of the invention will appear from the following detailed description as well as from the drawings. The same features and advantages described with respect to one aspect are applicable to the other aspects unless explicitly stated otherwise.

BRIEF DESCRIPTION OF THE DRAWINGS

Embodiments of the invention will now be described, by way of example, with reference to the accompanying schematic drawings, in which.

DETAILED DESCRIPTION

Figure 1A:
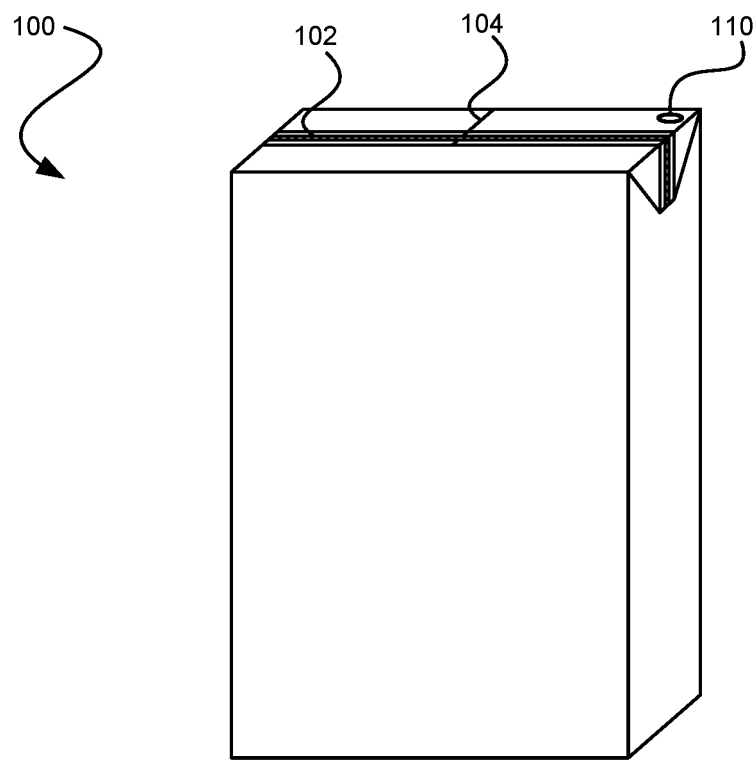
FIG. 1a illustrates, by way of example, a food package in a perspective view.

FIG. 1a illustrates a food package 100 by way of example. The food package 100 may be made of paperboard-based packaging material. Even though not illustrated, the packaging material may in addition to a paper-board layer, sometimes also referred to as carton layer, comprise plastic layers to protect print provided on the paperboard layer and also to avoid direct contact between a food product contained in the food package and the paperboard layer. The food package 100 can be produced by a roll fed packaging machine. The food package 100 comprises a longitudinal sealing 108 and a transversal sealing 102. More specifically, the food package 100 can comprise two transversal sealings, one at a top of the food package, and one at a bottom of the food package. The longitudinal sealing 108 may be created by the packaging machine to form a tube of the packaging material. The tube of packaging material may then be filled with the food product. The filled tube may then be sealed at two ends by the transversal sealing, thus forming the sealed food package 100. The longitudinal sealing 108 runs along the food package 100 from the bottom to top transversal sealing.

Figure 1B:
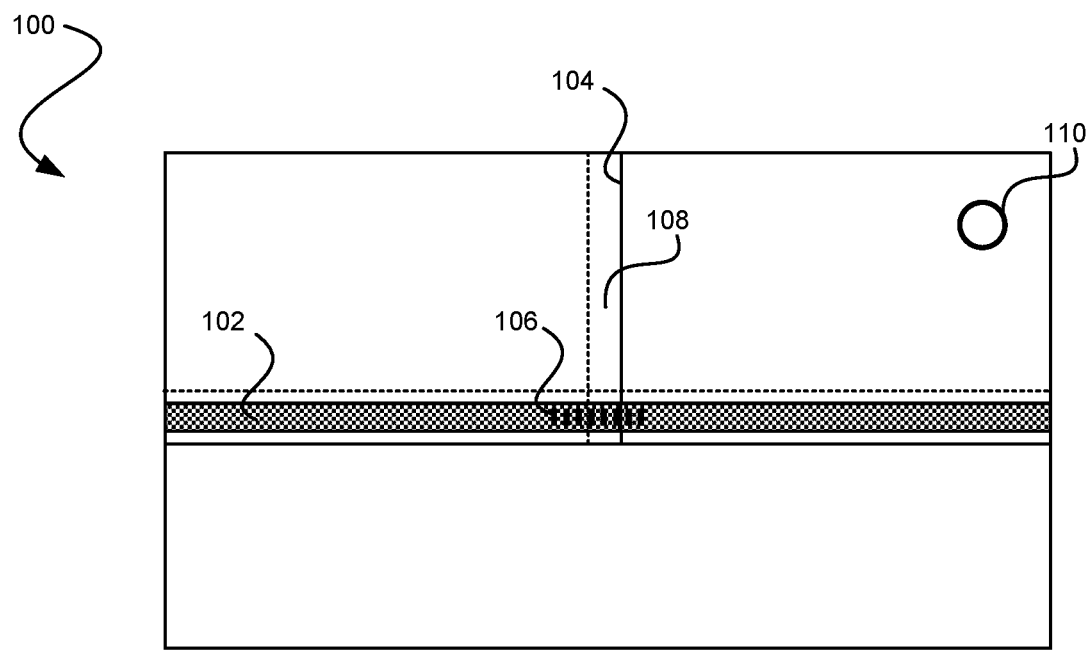
FIG. 1b-1d illustrates examples of the food package in FIG. 1a, in a top view.

FIG. 1b illustrates the food package 100 of FIG. 1a from a top view. The transversal sealing 102 is formed by pressing two sides of packaging material together. The food package 100 is provided with a reference imprint 106 in connection to the transversal sealing 102. The reference imprint 106 may be created by using an anvil with protrusions when creating the transversal sealing in the packaging machine. Such an anvil is further presented in connection to FIG. 3.

The food package 100 further comprises a reference line 104. The reference line 104 may be used to determine the quality measurement data. The reference line 104 may be an edge of the longitudinal sealing 108 as herein illustrated. Alternatively, the reference line 104 may be a printed line coincident with an edge of the food package 100. Further, more than one reference line may be used in combination for determining the quality measurement data, e.g. the edge of the longitudinal sealing as well as the printed line.

The longitudinal sealing 108 is created by sealing together two ends of packaging material. In FIG. 1b, the reference line 104 corresponds to the edge of the longitudinal sealing 108, i.e. the end of the packaging material which overlaps the other end of the packaging material on the outside of the longitudinal sealing 108. The dashed line which is parallel to the reference line 104 represents the end of the packaging material which overlaps on the inside of the food package 100. Thus, the area between the reference line 104 and the dashed line parallel to it represents the longitudinal sealing 108 in this example.

Similarly, the dashed line parallel to the transversal sealing 102 represents the point where overlapping material of the transversal sealing 102 ends. The transversal sealing 102 may cover a part of this section as illustrated in FIG. 1b, or it may cover the whole section.

The reference imprint 106 may comprise a sequence of valleys, herein illustrated as black sections, and ridges, herein referring to the section between the valleys. In other words, the reference imprint 106 may comprise physical marks in the packaging material. The reference imprint 106 may for instance comprise 6 to 10 valleys. The reference imprint 106 may extend 6 to 10 mm along the transversal sealing 102. The ridges and valleys can extend in parallel to the reference line 104. Having the paperboard-based packaging material allows for that imprints in the food package 100 can be made. For instance, packaging materials only comprising a plastic layer would not in the same way allow for imprints to be formed. Put differently, it has been realized that by using properties given by the packaging material, improved quality control can be achieved.

Alternatively, the reference imprint 106 can comprise a single mark. The single mark may be a valley or just a dot.

The reference imprint 106 may extend over the longitudinal sealing 108 as herein illustrated.

Figure 1C:
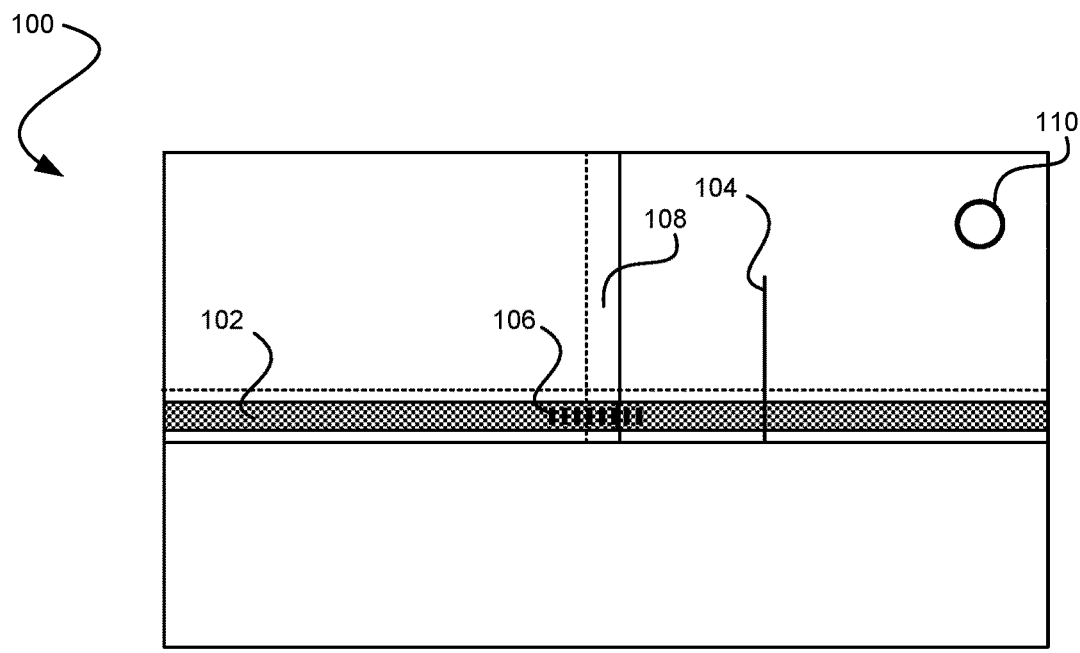
Figure 1D:
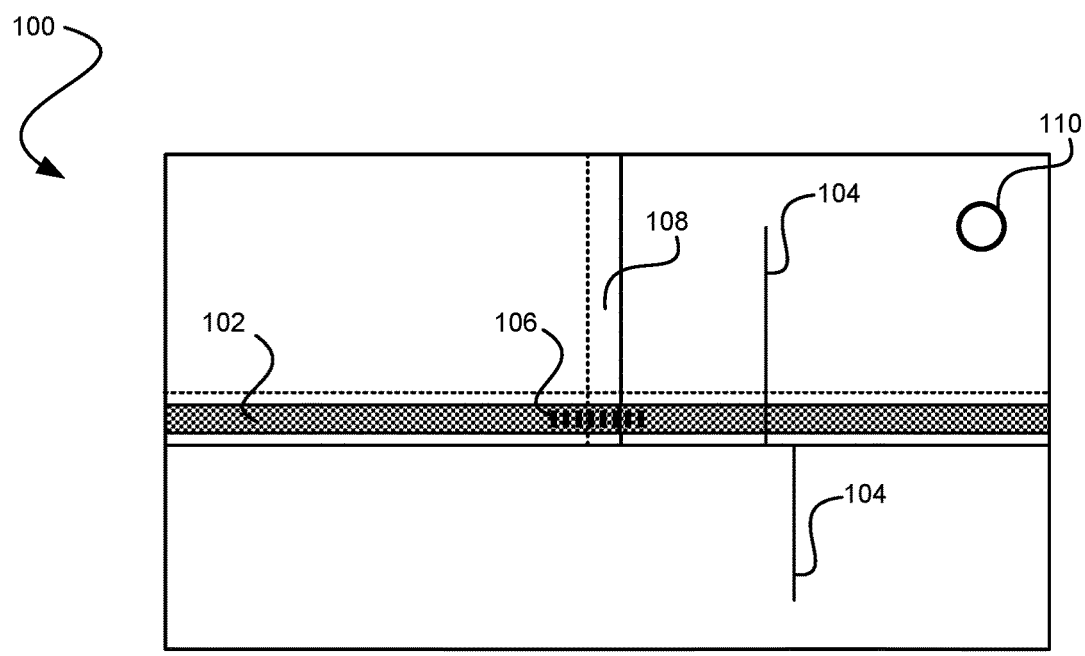

Alternatives to the reference line 104 presented in FIG. 1b is illustrates FIG. 1c and FIG. 1d. More specifically, FIG. 1c illustrates an example where the reference line 104 is provided on the food package 100 by being printed on the food package 100 instead of being the edge of the longitudinal sealing 108. In this example, the reference line 104 may be printed anywhere on the food package 100 where it can be captured in the same image data as the reference imprint 106. In FIG. 1d, it is illustrated having more than one reference line, in this non-limiting example two reference lines. The two reference lines 104 may be provided at two different ends of the transversal sealing 102. As an example, they may be provided such that the two reference lines 104 align when the transversal sealing 102 has been sealed correctly, and mis-align when for instance twisting has occurred during the sealing process.

As an additional example, the food package 100 may comprise a straw hole 110 as illustrated in FIG. 1a-d. The straw hole 100 may be used as the reference line 104. Thus, quality measurement data can be determined by determining the position of the reference imprint 106 relative the straw hole 110.

Figure 2:
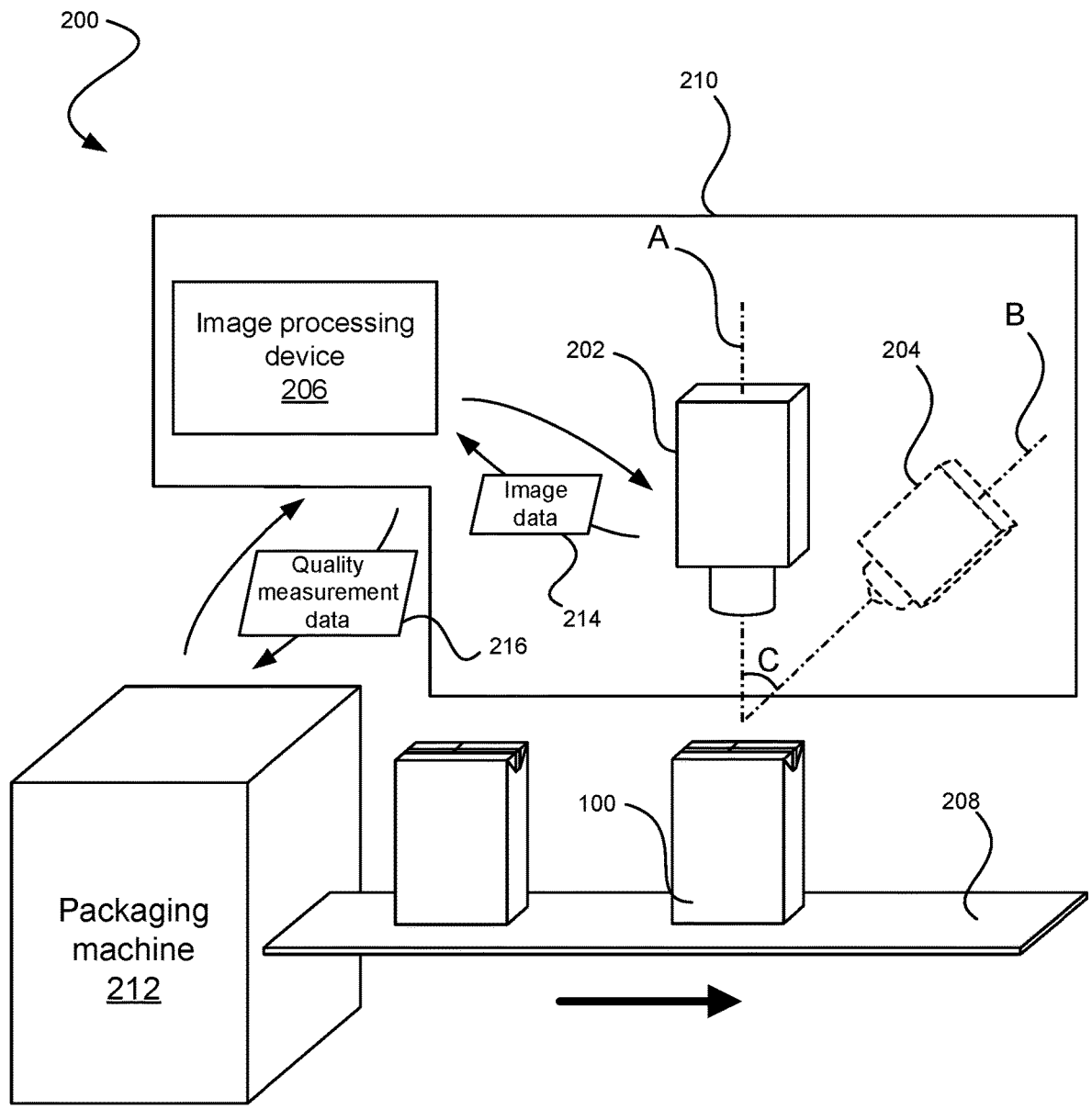
FIG. 2 illustrates, by way of example, an arrangement for assessing quality of a transversal sealing of a food package.

FIG. 2 illustrates a system 200 for assessing quality of a transversal sealing 102 of a food package 100. The food package 100 may be the food package 100 as described in connection to FIG. 1a-d. The system 200 comprises a packaging machine 212. The packaging machine 212 can be configured to produce the food package 100. The packaging machine 212 can for instance be a roll fed packaging machine.

The system 200 further comprises an arrangement 210 for assessing quality of the transversal sealing 102 of the food package 100. The arrangement 210 comprises a camera 202 configured to capture image data 214 of the transversal sealing 102. The arrangement 210 further comprises an image processing device 206. The image processing device 206 may be provided as a separate device from the camera 202 as illustrated herein. In such a case, the image processing device 206 and the camera 202 may be configured to communicate with each other. Alternatively, the image processing device 206 can be provided as part of the camera 202.

The image processing device 206 can be configured to determine, in the image data, a position of the reference imprint 106. The image processing device 206 may further be configured to determine, in the image data, a position of the reference line 104. Determining the positions of the reference imprint 106 and the reference line 104 may be done by using computer vision methods, for instance edge detection.

The image processing device may further be configured to determine quality measurement data 216 of the transversal sealing 102. The quality measurement data 216 may be based on the position of the reference imprint 106 relative to the position of the reference line 104. Based on the position of the reference imprint 106 relative the reference line 104, it may be possible to for instance detect if the packaging material was twisted during the sealing process.

The arrangement 210 may further comprise a light source 204 configured to illuminate the transversal sealing 102. The light source 204 may be arranged to illuminate the transversal sealing 102 along an illumination axis B at an angle C from an optical axis A of the camera 202. The angle C may be between 40 and 90 degrees. The illumination may serve the purpose of enhancing three-dimensional features of the reference imprint 106 and the reference line 104, for instance by creating shadows. The light source 204 may emit infrared light which can make it possible to filter out or reduce the presence of printed décor on the food package 100 so that the reference imprint and the reference line is more easily determined.

The food packages that are to be assessed can be continuously fed to the arrangement 210, for instance on a conveyor 208 as illustrated herein.

The arrangement 210 may be further configured to transmit the quality measurement data 216 to the packaging machine 212. The packaging machine 212 may be further configured to receive the quality measurement data 216. Based on the received quality measurement data the packaging machine 212 may be configured to adjust its settings. For instance, if the arrangement 210 communicates to the packaging machine 212 that the food packages 100 produced has deficient transversal sealings 102, the packaging machine 212 can adjust the settings of the transversal sealing process to correct any errors. Alternatively, the arrangement 210 can communicate which, if any, of the food packages 100 are deficient, so that the packaging machine 212 can discard those food packages.

In FIG. 2, the arrangement 210 is provided after the packaging machine 212. It is to be noted that the arrangement 210 may be provided inside the packaging machine 212. The arrangement 210 can for instance be installed in a pre-existing packaging machine or processing line. In another example, the arrangement 210 may be used in a system separated from the packaging machine that has produced the food packages. In such a system, finished food packages can be continuously fed to the arrangement 210 to determined which, if any, of the food packages that needs to be discarded due to deficient transversal sealings.

Figure 3A:
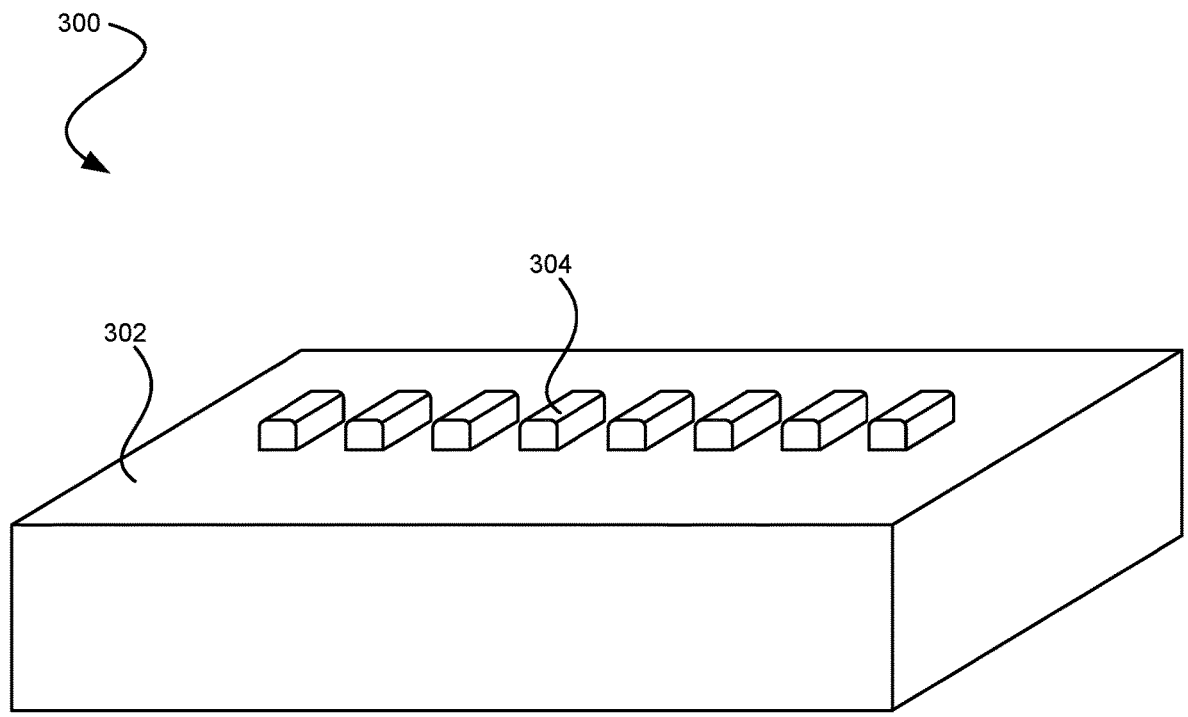
FIG. 3a and FIG. 3b illustrates, by way of example, an anvil for creating a reference imprint on a transversal sealing.
Figure 3B:
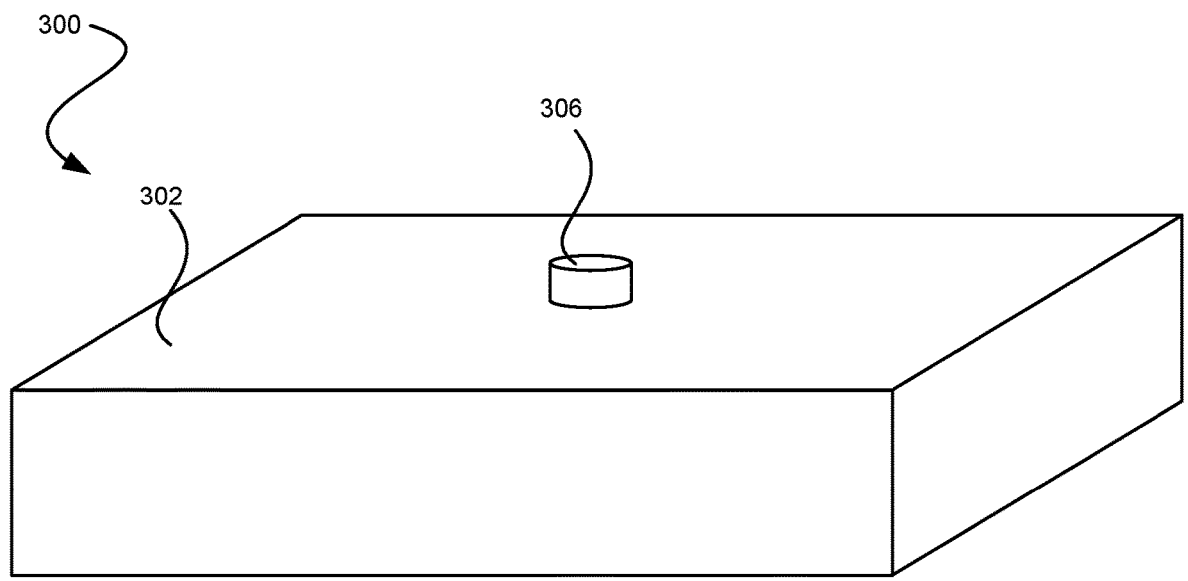

FIG. 3a and FIG. 3b illustrates, by way of example, two different anvils that may be used in the transversal sealing process to generate the transversal sealing as well as the reference imprint. The anvil 300 may have a first surface 302. The packaging material can be pressed against the first surface 302 to create the transversal sealing. Further, the anvil 300 may have a second surface 304, 306. The second surface 304, 306 can create the reference imprint in the packaging material.

The second surface 304, 306 may be a number of rectangularly shaped protrusions as illustrated in FIG. 3a. Alternatively, the second surface 304, 306 may be a single protrusion as illustrated in FIG. 3b having for instance a circular shape. It is noted that the shape, scale and number of protrusions are merely examples for illustrative purposes, and should be regarded as non-limiting examples.

Figure 4:
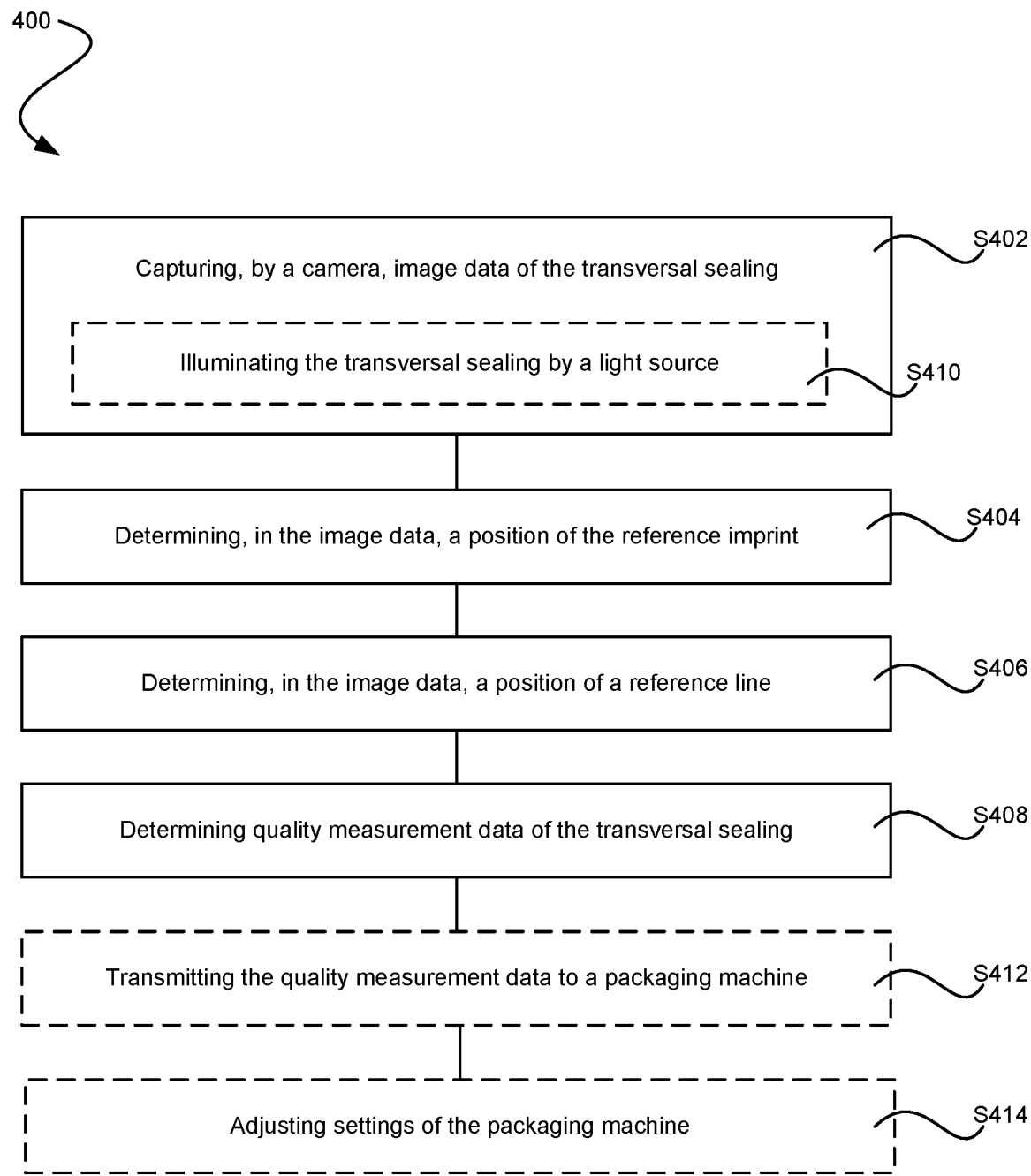
FIG. 4 is a flow-chart illustrating the steps of a method for assessing quality of a transversal sealing of a food package.

FIG. 4 is a flow chart illustrating the steps of a method 400 for assessing quality of a transversal sealing of a paperboard-based food package. Wherein the food package comprises a longitudinal sealing, and is provided with a reference imprint in connection to the transversal sealing.

In a first step S402, image data of the transversal sealing may be captured by a camera.

In a second step S404, a position of the reference imprint may be determined in the image data.

In a third step S406, a position of a reference line may be determined in the image data.

In a fourth step S408, quality measurement data of the transversal sealing may be determined. This may comprise determining the distance between the reference line and a pre-determined section of the reference imprint.

Optionally, the first step S402 may comprise the sub-step S410 of illuminating the transversal sealing by a light source.

Optionally, in a fifth step S412, the quality measurement data may be transmitted to a packaging machine.

Optionally, in a sixth step S414, settings of the packaging machine may be adjusted based on the quality measurement data.

Even though described in a certain order, the different steps may also be performed in other orders as well as multiple times.

From the description above follows that, although various embodiments of the invention have been described and shown, the invention is not restricted thereto, but may also be embodied in other ways within the scope of the subject-matter defined in the following claims.

Various aspects of the present invention may be appreciated from the following enumerated example embodiments (EEEs):

EEE1. A method for assessing quality of a transversal sealing 102 of a paperboard-based sample food package 100, wherein the sample food package 100 comprises a longitudinal sealing 104 and is provided with a reference imprint 106 in connection to the transversal sealing 102, the method comprising
capturing, by a camera 202, sample image data depicting at least the transversal sealing 102 and the reference imprint 106,
extracting features from the sample image data, wherein the features are spatial and/or spectral features of the image data,
transmitting the features to a decision engine, and
receiving a response from the decision engine, wherein the response is a positive response indicating that the food package is within quality standard, or a negative response indicating that the food package is outside the quality standard.

The wording "quality standard" may be a broadly agreed industry standard, but it may also be a set of requirements used only for one or a few of packaging machines. If using an artificial intelligence (AI) decision engine, the quality standard may be set by the AI decision engine when this is trained.

The extracting step may be made in the camera 202 if this is provided with processing capabilities for such extraction. It may also be made on a server housing the decision engine, that is, the image data can be transmitted from the camera to the server and once received the features are extracted and transmitted to the decision engine. A further alternative is to have several servers, one for extracting the features and one for housing the decision engine.

EEE2. The method according to EEE1, wherein the decision engine is an artificial intelligence (AI) decision engine.

EEE3. The method according to EEE1 or EEE2, wherein the decision engine comprises a graph-based database.

EEE4. The method according to any one of EEE1 to EEE3, wherein a reference line 104 is provided on the sample package 100 and depicted in the sample image data.

EEE5. The method according to EEE4, wherein the reference line 104 is an edge of the longitudinal sealing.

EEE6. The method according to any one of EEE1 to EEE5, wherein the reference imprint 106 comprises a sequence of valleys and ridges in a packaging material of the food package 100.

EEE7. The method according to EEE6, wherein the ridges and valleys extends parallel to the reference line 104.

EEE8. The method according to any of EEE6 or EEE7, wherein the reference imprint 106 comprises at least three valleys.

EEE9. The method according to any one of EEE1 to EEE8, wherein the reference imprint extends over the longitudinal sealing.

EEE10. The method according to any of EEE1 to EEE9, wherein the step of capturing the image data comprises the sub-step of illuminating the transversal sealing by a light source 204 along an illumination axis B, wherein the illumination axis B forms an angle C of 40 to 90 degrees to the optical axis A of the camera 202.

EEE11. The method according to EEE10, wherein the transversal sealing 102 is illuminated by infrared light.

EEE12. The method according to any one of EEE1 to EEE11, wherein the transversal sealing 102 is on a top of the food package 100 or on a bottom of the food package 100.

EEE13. A method for training a decision engine for assessing quality of a transversal sealing 102 of a paperboard-based sample food package 100, said method comprising
providing a first data set of image data depicting a first plurality of training food packages 100 deemed to be within a quality standard,
providing a second data set of image data depicting a second plurality of training food packages 100 deemed to be outside the quality standard,
forming a set of rules for assessing sample image data depicting the sample food package, thereby providing for that the decision engine is configured to indicate whether the sample food package is within or outside the quality standard.

The invention claimed is:

1. A method for assessing quality of a transversal sealing of a paperboard-based food package, wherein the food package comprises a longitudinal sealing, and is provided with a reference imprint in connection to the transversal sealing, the method comprising:
capturing, by a camera, image data of the transversal sealing;

determining, in the image data, a position of the reference imprint;

determining, in the image data, a position of a reference line; and determining quality measurement data of the transversal sealing based on the position of the reference imprint relative to the position of the reference line, wherein the reference line is printed on the food package or the reference line is an edge of the longitudinal sealing.

2. The method according to claim 1, wherein the reference imprint comprises a sequence of valleys and ridges in a packaging material of the food package.

3. The method according to claim 2, wherein the ridges and valleys extend parallel to the reference line.

4. The method according to claim 2, wherein the reference imprint comprises at least three valleys.

5. The method according to claim 2, wherein the reference imprint extends over the longitudinal sealing.

6. The method according to claim 1, wherein the step of capturing the image data comprises the sub-step of illuminating the transversal sealing by a light source along an illumination axis, wherein the illumination axis forms an angle of 40 to 90 degrees to an optical axis of the camera.

7. The method according to claim 6, wherein the transversal sealing is illuminated by infrared light.

8. The method according to claim 1 wherein the transversal sealing is on a top of the food package or on a bottom of the food package.

9. The method according to claim 1, wherein determining the quality measurement data comprises determining a distance between the reference line and a pre-determined section of the reference imprint.

10. The method according to claim 1, wherein the method further comprises:

transmitting the quality measurement data to a packaging machine, and adjusting settings of the packaging machine based on the quality measurement data.

11. An arrangement for assessing quality of a transversal sealing of a food package, wherein the food package comprising a longitudinal sealing, and provided with an reference imprint in connection to the transversal sealing, the arrangement comprising:

a camera configured to capture image data of the transversal sealing;

an image processing device configured to, determine, in the image data, a position of the reference imprint;

determine, in the image data, a position of a reference line; and determine a quality measurement data of the transversal sealing based on the position of the reference imprint relative to the position of the reference line, wherein the reference line is printed on the food package or the reference line is an edge of the longitudinal sealing.

12. The arrangement according to claim 11, wherein the arrangement further comprises a light source configured to illuminate the transversal sealing along an illumination axis at an angle from an optical axis of the camera.

13. A system, comprising:

a packaging machine configured to produce food packages; and the arrangement for assessing quality of transversal sealings of the food packages according to claim 11; and wherein the arrangement is further configured to transmit the quality measurement data to the packaging machine, wherein the packaging machine is further configured to receive the quality measurement data, and adjust settings based on the quality measurement data.

14. A non-transitory computer-readable storage medium having stored thereon program code portions for implementing the method of claim 1 when executed on a device having processing capabilities.

* * * * *